COMPARATOR USING RESISTOR-DIODE LOGIC

Filed July 15, 1966 3 Sheets-Sheet 1

INVENTOR.
BERNHART W. NELSON
BY Menotti J. Lombardi Jr.
ATTORNEY

COMPARATOR USING RESISTOR-DIODE LOGIC

Filed July 15, 1966 3 Sheets-Sheet 2

Fig. 3

TRUTH TABLE

| | A | | Ā | | B | | C | | D | | -D | | E | | F | |
|---|---|---|---|---|---|---|---|---|---|---|---|---|---|---|---|---|
| | VOLTS | LOGIC | VOLTS | LOGIC | VOLTS | LOGIC | VOLTS | LOGIC | VOLTS | LOGIC | VOLTS | LOGIC | VOLTS | LOGIC | VOLTS | LOGIC |
| CASE I | −V | 1 | 0 | 0 | −V | 1 | 0 | 0 | 0 | 0 | 0 | 0 | 0 | 0 | −V | 1 |
| CASE II | −V | 1 | 0 | 0 | 0 | 0 | 0 | 0 | +V/3 | 1 | −V/3 | 1 | −V/3 | 1 | 0 | 0 |
| CASE III | 0 | 0 | −V | 1 | −V | 1 | −V/3 | 1 | 0 | 0 | 0 | 0 | −V/3 | 1 | 0 | 0 |
| CASE IV | 0 | 0 | −V | 1 | 0 | 0 | 0 | 0 | 0 | 0 | 0 | 0 | 0 | 0 | −V | 1 |

INVENTOR.
BERNHART W. NELSON
BY
Menotti J. Lombardi Jr.
ATTORNEY

INVENTOR.
BERNHART W. NELSON
BY Menotti J. Lombardi Jr.
ATTORNEY

United States Patent Office 3,496,539
Patented Feb. 17, 1970

3,496,539

COMPARATOR USING RESISTOR-DIODE LOGIC

Bernhart Walter Nelson, River Vale, N.J., assignor to International Telephone and Telegraph Corporation, a corporation of Delaware

Filed July 15, 1966, Ser. No. 565,497
Int. Cl. G06f *7/02*
U.S. Cl. 340—146.2 5 Claims

ABSTRACT OF THE DISCLOSURE

A resistor-diode arrangement is connected to simultaneously compare two parallel inputs, each input having *n* bits. For each two bits to be compared the combination of three resistors and two diodes are used, such that when the output of the resistor-diode arrangement is applied to output logic means, an output is produced indicative of a comparison between the two parallel inputs.

This invention relates to a multibit comparator and more particularly to a multibit comparator using resistor-diode logic.

In a parallel digital word comparator a multiplicity of bits must simultaneously be compared, and if all the bits of each word are in agreement, then a signal is produced indicative of a match. This is normally accomplished by feeding each bit for each of the parallel words to an "exclusive OR" gate, and the gates are ganged to produce an output on complete agreement. However, the use of an "exclusive OR" gate for each bit requires a multiplicity of components since each gate is composed in a typical circuit of a number of diodes and resistors, and a transistor.

Accordingly, the use of the circuit according to the invention will save components and power as compared to the "exclusive OR" method, because only two diodes and three resistors are required for each bit to be compared. This permits two parallel digital words of any bit length to be simultaneously compared for total bit agreement.

An object of this invention is to produce a logic agreement output when two parallel inputs digital words are in complete bit agreement.

Another object of this invention is to provide a high speed multibit comparator using resistor-diode logic, thereby eliminating the need of an "exclusive OR" gate for each pair of bits to be compared.

According to the broader aspects of the invention, a resistor-diode arrangement is connected to simultaneous compare two parallel inputs, each input having *n* bits. For each two bits to be compared the combination of three resistors and two diodes are used, such that when the output of the resistor-diode arrangement is applied to gating and invertor means, an output is produced indicative of a comparison between the two parallel inputs.

Other objects and advantages of the present invention will become more apparent by reference to the following description taken in conjunction with the accompanying drawings, in which:

FIGURE 3 is a truth table showing the voltage and logic levels according to the invention.

Figure 1:
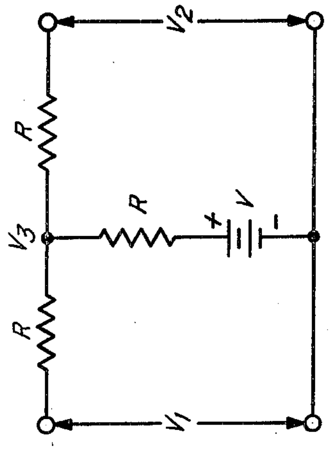
FIGURE 1 is the voltage comparison principle used according to the invention.

The voltage comparison principle according to the invention is shown in FIGURE 1. Three equal resistances R are connected to a junction V3. A battery V applies a positive potential to junction V3, and the terminal points of the network are indicated by V1 and V2. Then if $V1=V2=0$, $$V_3=+\frac{V}{3}$$

by standard calculation. In the second case, if $V1=-V$ and $V2=0$, then $V3=0$. In the third case, if $V1=0$ and $V2=-V$, then $V3=0$. For the last case, when $V1=V2=-V$, then $$V_3=-\frac{V}{3}$$

So that if $-V$ is considered a logic level "1" and 0 volts is considered a logic level "0," and V1 and V2 are logic bit inputs, then the examination of V3 determines bit agreement or disagreement.

Therefore, if $V1=V2$ then an output voltage V3 is formed, and if $V1\neq V2$, than $V3=0$.

Figure 2:
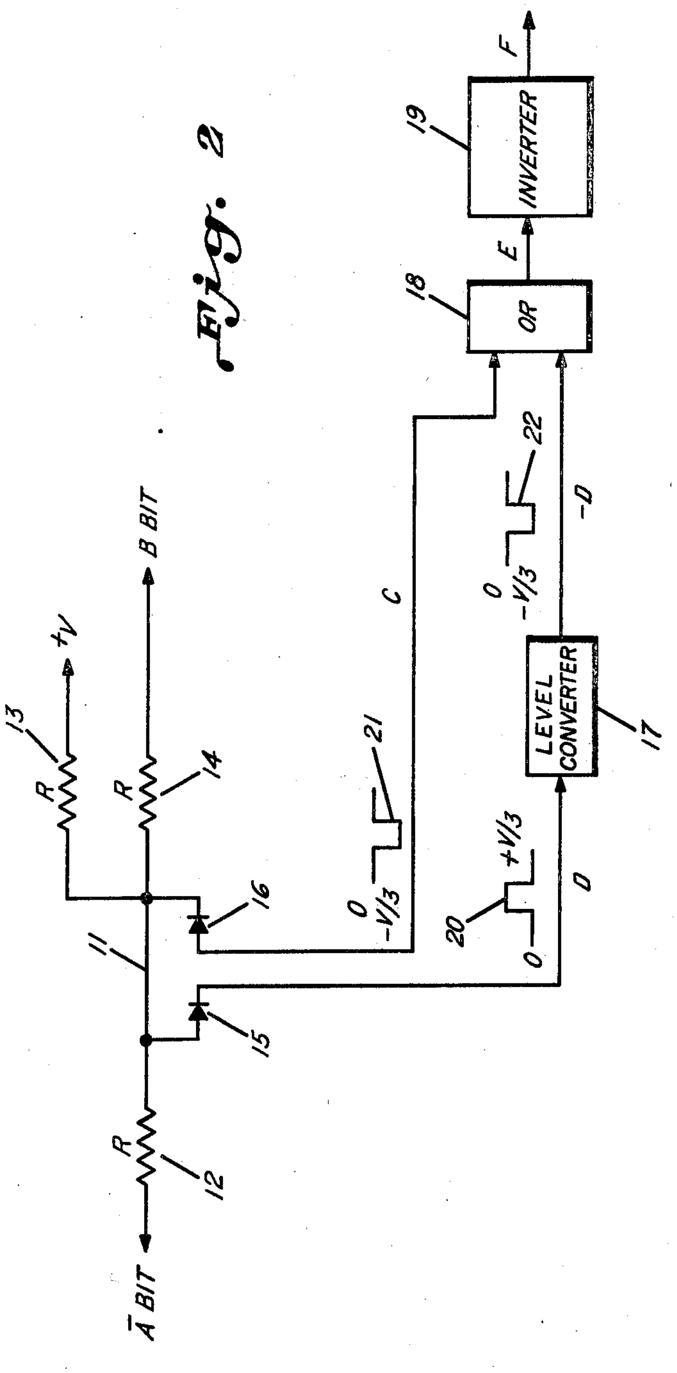
FIGURE 2 is a two bit comparator according to the invention.

Following the voltage comparison principle, the circuit for comparing two bits is shown in FIGURE 2 and taken in conjunction with FIGURE 3 will illustrate the operation of the circuit. To junction 11 there is connected three resistors of equal value R, indicated as 12, 13, and 14. Resistor 13 is connected from junction 11 to a source of positive potential +V. Diode 15 is connected in a forward bias direction from junction 11 by line D to voltage level converter 17. A similar diode 16 is connected in a reverse bias direction from junction 11 by line C to OR gate 18. The output of converter 17 is connected by line —D to OR gate 18, and the output from gate 18 is connected by line E to invertor 19 to produce an output in line F on agreement according to the truth table.

The diodes are arranged so that the positive output pulse 20 appears on line D, and the negative pulse 21 appears on line C. Pulse 20 has its voltage level changed by converter 17 to produce a negative pulse 22. Both negative pulses 22 on line —D and 21 on line C are fed to OR gate 18.

With reference to FIGURE 3, asuming the condition of case I, it is desired to compare bit A with bit B which are equal to —V volts and logic "1." The voltage applied to resistor 12 will be $\overline{A}$ equal to 0 volts and the voltage to resistor 14 will be —V volts. Then because of the potential at junction 11, there is an absence of voltage at C, D, —D, and E, and invertor 19 produces an output voltage —V indicative of an agreement "1" between A and B. In cases II, A is equal to —V volts, logic "1," and B is equal to 0 volts, which because of the potential at junction 11 and equal resistances R, a $+V/3$ volts will occur at D, a $-V/3$ volts at —D, and a $-V/3$ volts at E. This will not produce an output at F which is indicative of logic "0" and a mismatch. Case III indicates logic "0" and mismatch when A is zero volts and B is —V volts, and in case IV an output is produced at F, logic "1," when both A and B are 0 volts.

Figure 4:
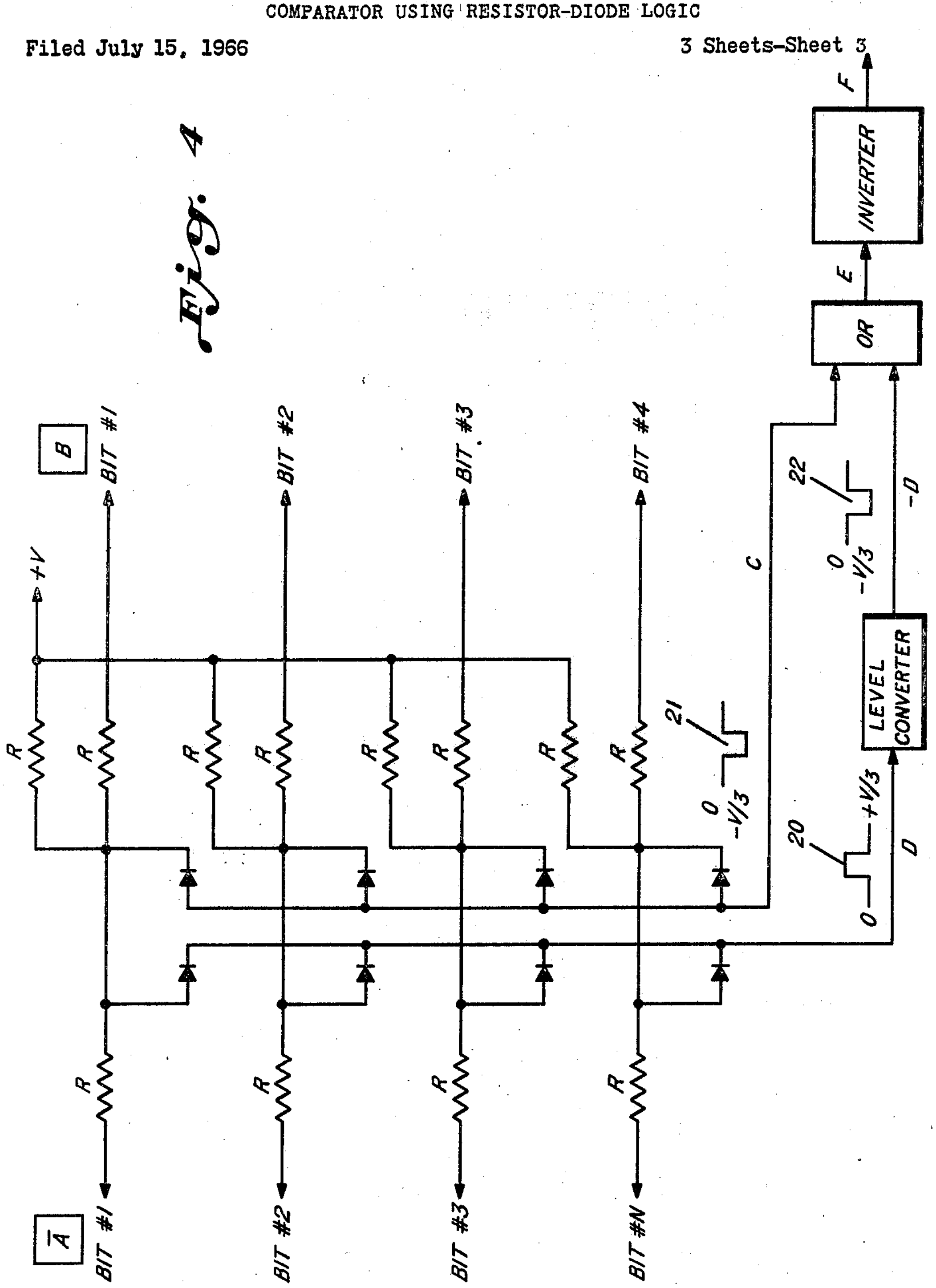
FIGURE 4 is the circuit for the multibit comparator acording to the invention.

FIGURE 4 shows the multibit comparator according to the invention using the principles hereinbefore described. However, $\overline{A}$ now represents a digital word having *n* bits, and B represents a parallel digital word having *n* bits. The truth table is applicable to all *n* bits and each bit of word A must agree with each parallel bit of word B in order to have an agreement, logic "1," at F. If one bit of word A does not agree with its associated parallel bit of word B, than no output is produced at F. If more than one bit does not agree, the pulses 21, 20 will indicate $+V/3$ or $-V/3$ respectively, because of the parallel connection of the resistors and diodes.

It should be obvious to one skilled in the art that +V volts could be made —V volts, and that both diodes may be reversed with the appropriate changes in the pulses being indicated at C, D, and —D.

By the above method 32 bit words have been successfully compared, and it should be indicated if not already obvious, that this arrangement is not limited to digital word comparison. For example, if A represents an N bit counter that is fed by a clock, and B represents a preset number, then when the counter agrees with the preset number an output will be indicated at F which then may be used to reset the counter.

I claim:

1. In a bit comparator the combination of:

a pair of resistive input circuits coupled to a common junction to compare a first bit applied to one of said circuits to a second bit applied to the other of said circuits;

a source of potential connected by a resistor to said common junction;

a pair of unidirectional current carrying devices, one of said devices being connected to said junction in a forward biased direction with respect to said source of potential and the other of said devices being connected to said junction in a reverse biased direction with respect to said source of potential; and means coupled to said devices to produce an output indicative of the comparison to be made between said first and second bits.

2. A bit comparator according to claim 1, wherein each of said resistive circuits has the same resistance value, and said resistor coupling said source of potential to said junction has a resistance value equal to each of said resistive circuits, such that the potential existing at said junction is indicative of the comparison to be made between said first and second bit.

3. A bit comparator according to claim 2 in which said means comprises:

a level converter coupled to said forward biased device;

an OR gate coupled to said reverse biased device and to said converter, said OR gate to produce a signal upon excitation from either of said devices; and an inverter coupled to said OR gate whereby said inverter in response to said signal produces said output indicative of the comparison to be made between said first and second bit.

4. A multibit comparator comprising:

a resistor-diode arrangement being connected to simultaneously compare two parallel inputs, each of said inputs having a multiplicity of bits;

said resistor-diode arrangement including three equal value resistors and two diodes in combination for each bit pair to be compared;

a source of potential is applied through one of said resistors to a common junction formed by the other two of said resistors, said diodes being connected to said junction with one diode in a forward and one diode in a reverse biased direction with respect to said source of potential, and each combination of three resistors and two diodes being connected in parallel with a succeeding combination; and means connected to the two diodes in combination for each bit pair to be compared to produce an output indicative of the simultaneous comparison to be made between said parallel inputs.

5. A multibit comparator according to claim 4 wherein said means comprises:

a level converter coupled to a lead in common to the parallel connected diodes of one parallel input;

an OR gate coupled to a lead in common to the parallel connected diodes of the other parallel input, and coupled to said converter, said OR gate responsive to a signal on either of said leads; and an inverter coupled to said OR gate, whereby in response to said signal said inverter produces said output indicative of the simultaneous comparison to be made between said parallel inputs.

References Cited

UNITED STATES PATENTS

| | | | |
|---|---|---|---|
| 2,979,695 | 4/1961 | Tyrlick et al. | 340—146.2 |
| 3,137,789 | 6/1964 | Chiapuzio | 340—146.2 X |

OTHER REFERENCES

P. E. Locke: Electrical Decimal Comparison Circuit, IBM Technical Disclosure Bulletin, June 1960, p. 61.

MALCOLM A. MORRISON, Primary Examiner

D. H. MALZAHN, Assistant Examiner

U.S. Cl. X.R.

307—216